United States Patent
Tate et al.

(10) Patent No.: US 6,824,581 B1
(45) Date of Patent: Nov. 30, 2004

(54) PLEATED FILTER MEDIA WITH EMBOSSED SPACERS AND CROSS FLOW

(75) Inventors: Jason LaMarr Tate, Bessemer City, NC (US); Edward Allen Covington, Gastonia, NC (US); Roland Vann Lanier, Jr., Belmont, NC (US)

(73) Assignee: Dana Corporation, Toledo, OH (US)

( * ) Notice: Subject to any disclaimer, the term of this patent is extended or adjusted under 35 U.S.C. 154(b) by 49 days.

(21) Appl. No.: 10/135,374

(22) Filed: May 1, 2002

Related U.S. Application Data (60) Provisional application No. 60/287,420, filed on May 1, 2001.

(51) Int. Cl.[7] .......................... B01D 27/06; B01D 46/10
(52) U.S. Cl. ......................... 55/385.3; 55/497; 55/502; 55/511; 55/521; 210/487; 210/493.3
(58) Field of Search .................... 55/385.3, 497–499, 55/502, 503, 511, 521, 385.1; 210/487, 493.1, 493.3, 493.5, 193.1

(56) References Cited

U.S. PATENT DOCUMENTS

| | | | | |
|---|---|---|---|---|
| 2,135,863 A | * | 11/1938 | Walker ......................... | 55/499 |
| 2,784,802 A | * | 3/1957 | Bub et al. ..................... | 55/521 |
| 2,908,350 A | * | 10/1959 | Buckman ...................... | 55/484 |
| 2,936,855 A | * | 5/1960 | Allen et al. .................... | 55/498 |
| 2,945,559 A | * | 7/1960 | Buckman ...................... | 55/500 |
| 3,531,920 A | * | 10/1970 | Hart ............................. | 55/497 |
| 3,799,354 A | * | 3/1974 | Buckman et al. ........ | 210/493.1 |
| 4,268,290 A | * | 5/1981 | Barrington .................... | 55/521 |
| 4,452,619 A | * | 6/1984 | Wright et al. ................. | 55/521 |
| 5,053,131 A | * | 10/1991 | Lippold ...................... | 210/493.5 |
| 5,066,400 A | * | 11/1991 | Rocklitz et al. .......... | 210/493.5 |
| 5,306,321 A | * | 4/1994 | Osendorf ...................... | 55/487 |
| 5,674,302 A | * | 10/1997 | Nakayama et al. ........ | 55/385.3 |
| 5,766,290 A | | 6/1998 | Zievers et al. | |
| 5,853,438 A | | 12/1998 | Igarashi | |
| 5,888,262 A | * | 3/1999 | Kahler ......................... | 55/497 |
| 6,165,241 A | | 12/2000 | Choi | |
| 6,200,465 B1 | * | 3/2001 | Carawan et al. .............. | 210/94 |
| 6,336,946 B1 | * | 1/2002 | Adams et al. ............. | 55/385.3 |
| 6,361,577 B1 | * | 3/2002 | Unrath et al. ................. | 55/482 |
| 6,375,700 B1 | * | 4/2002 | Jaroszczyk et al. ........... | 55/498 |
| 6,402,800 B1 | * | 6/2002 | Rey ............................. | 55/498 |
| 2003/0075500 A1 | * | 4/2003 | Kleingunther et al. ... | 210/493.1 |

FOREIGN PATENT DOCUMENTS

| | | |
|---|---|---|
| DE | 38 15 145 C1 | * 10/1989 |
| WO | WO 93/02769 A1 | * 2/1993 |

\* cited by examiner

*Primary Examiner*—Robert H. Spitzer
(74) *Attorney, Agent, or Firm*—Millen, White, Zelano & Branigan, P.C.

(57) ABSTRACT

A panel filter element has a pleated filter media having peaks and valleys arranged in pleated sets of first and second panels. The pleated sets are adhered along side edges to form clean-side pockets which open adjacent to the valleys. The first and second panels have elongated embossments projecting both into and away from the pockets to keep the pockets open and to keep the pleated sets separate. Dirty air flows into the filter media both transverse to the peaks and laterally between the pleated sets of first and second panels. By having dirty air to be filtered flowing both transversly and laterally, the dirt holding capacity of the filter is increased while increases in restriction are minimized.

15 Claims, 7 Drawing Sheets

PLEATED FILTER MEDIA WITH EMBOSSED SPACERS AND CROSS FLOW

RELATED PATENT APPLICATION

This application claims priority from provisional application Ser. No. 60/287,420 filed May 1, 2001 and titled "Cross Flow Filter Element."

FIELD OF THE INVENTION

The present invention relates to a filter element having a filter media with embossed spacers. More particularly, the present invention is directed to a filter element having a filter media with embossed spacers which allow for cross flow of dirty air into the filter media.

BACKGROUND OF THE INVENTION

Filter elements which use filter media having spacer arrangements between panels of the media for filtering particulate bearing fluid streams are known in the art. However, the spacers tend to be inserted elements which increases the cost of filter media and can compromise the reliability of the filter media. This is because inserted spacers can become dislodged and damage the filter media if on the upstream or dirty side of the filter media. If on the clean side of the filter media, the spacers can become dislodged and possibly damage the machinery served by the filter media.

With respect to air filters for internal combustion engines, there is continuing need to increase dirt holding capacity while reducing restriction. Preferably, this is accomplished as inexpensively as possible. With respect to filters for diesel trucks, increased dirt holding capacity with acceptable restriction levels is currently only obtainable with cylindrical filters used for medium and heavy duty applications. In order to conserve space in engine compartments panel air filters are now being employed, but panel air filters have encountered the aforementioned problems of reduced dirt holding capacity and relatively high restriction. Accordingly, there is a need for improvement in panel air filters.

SUMMARY OF THE INVENTION

In view of the aforementioned considerations, a panel filter element having a pleated filter media is utilized wherein the pleated filter media has plurality of embossments with first sets of embossments projecting from the clean side of the pleats and second sets of embossments projecting from the dirty side of the pleats. Edges of the pleats are closed. Consequently, dirty air flows both transversely through the dirty-side face of the filter media and laterally between the pleats.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
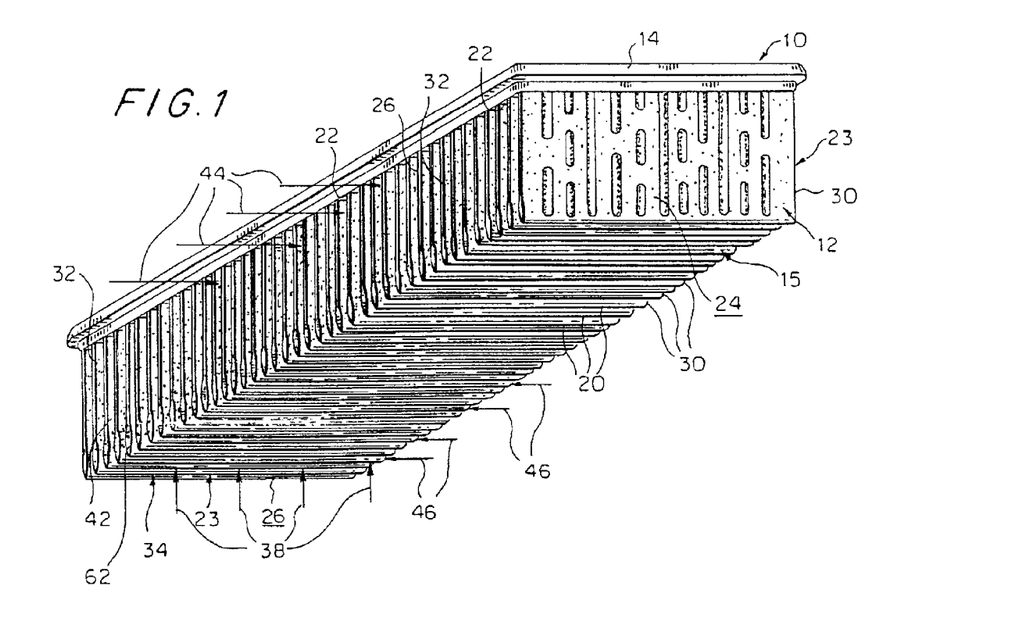
FIG. 1 is a bottom perspective view of the filter element configured in accordance with the present invention.
Figure 2:
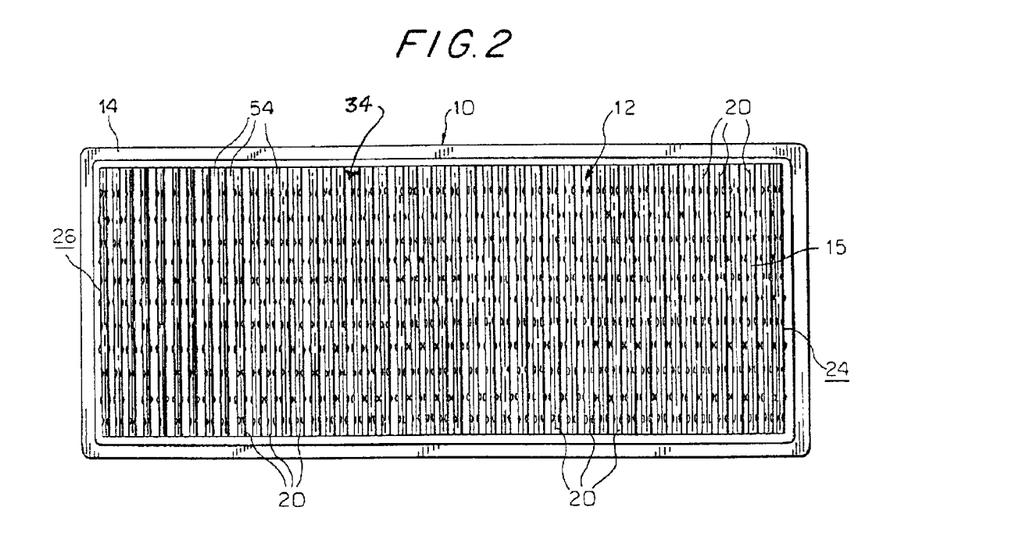
FIG. 2 is a bottom planar view of the filter of FIGS. 1 and 2.
Figure 3:
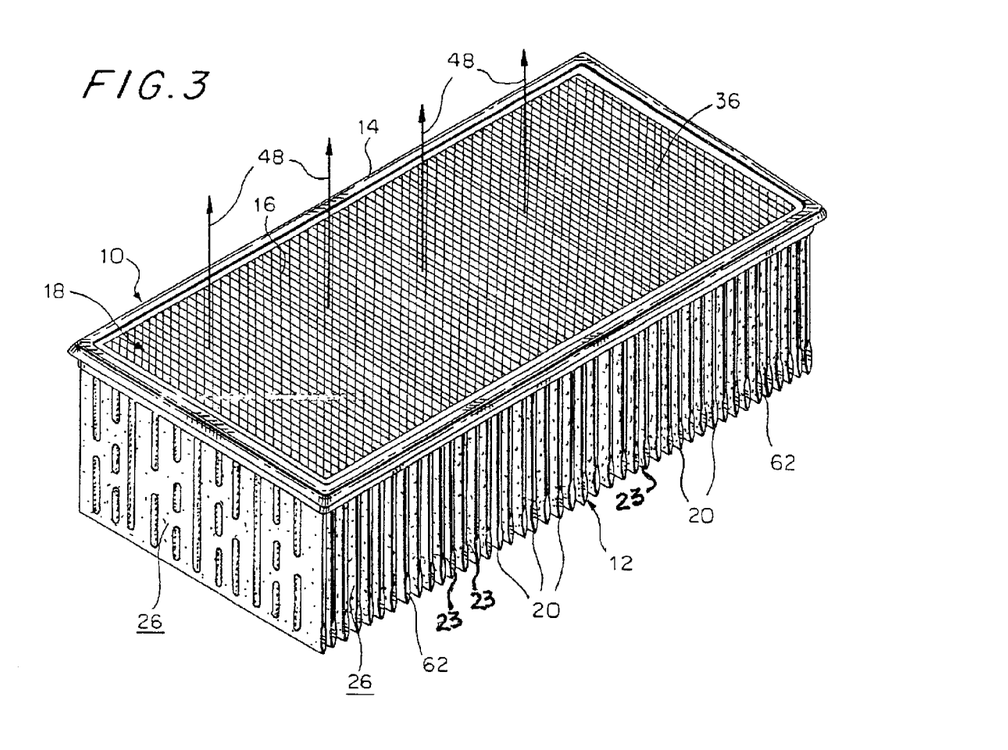
FIG. 3 is a top perspective view of the filter element of FIG. 1.
Figure 4:
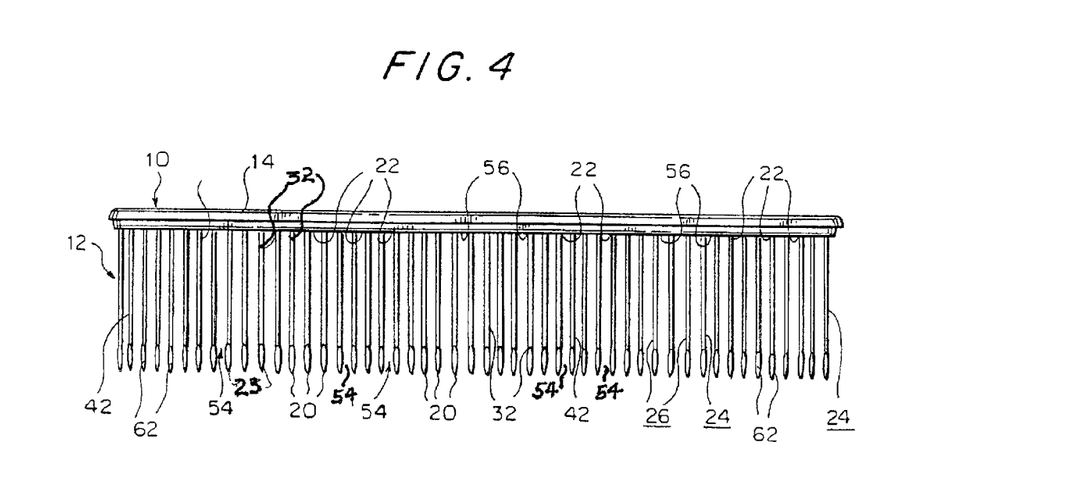
FIG. 4 is a side view of the filter of FIGS. 1–3.

Referring now to FIGS. 1, 2 and 3 there is shown a filter element 10 configured in accordance with the principles of the present invention. The filter element 10 includes a pleated filter media 12 and a peripheral seal 14. The peripheral seal 14 is made of a rubber or rubber-like polymer material, for example polyurethane. FIGS. 1 and 2 illustrate the dirty side 15 of the filter element 10. As is seen in FIG. 3, the top of the filter element 10 is covered by an expanded metal screen 16 which covers the clean side 18 of the filter element 10.

Pleated filter media 12 has peaks 20 and valleys 22 defined by pleat forming sets 23 of first and second panels 24 and 26 that are closed adjacent first and second edges 30 and 32. Peaks 20 occur in a plane which defines a dirty-side face 34 of the filter media 12, while the valleys 22 occur in a plane which defines a clean-side face 36 of the filter media. In accordance with the principles of the present invention, dirty air enters the filter media in directions transverse to the dirty-side face 34 as indicated by arrows 38 and laterally to the dirty-side face through side filter media faces 40 and 42 of the first and second panels 24 and 26 in the directions of arrows 44 and 46, respectively. As is seen in FIG. 3, clean air exits the filter element 10 through the clean side face 36 in the direction of arrows 48. The peaks 20 and valleys 22 are determined by the direction 38 of dirty air flow through the filter media 12 so that the peaks are at the bottom and the valleys are above the peaks.

Referring now to FIGS. 4–7 showing side and end views of the filter element 10, it is seen that the pleat sets 23 formed by the first and second panels 24 and 26 are adhered only at their edges 30 and 32 (FIG. 1). Consequently, gaps 54 are maintained between adjacent pleat forming sets 23. Accordingly, dirty air can pass laterally between the pleat sets 23 in the direction of arrows 44 and 46 (see FIG. 1). Spacing is maintained between the pleat sets 23 adjacent the edges 30 and 32 by having substantially flat or obtuse valley floors 56 to keep the edges 30 and 32 of the sets 23 spaced from one another, and by having arrays 60 of spaced embossments and a continuous embossment 61 projecting from the dirty sides 40 and 42 of the first and second panels 24 and 26. The embossments 60 have spaces 64 therebetween to allow dirty air to continually pass laterally between the sides 40 and 42 of the pleated filter media 12. As will be explained hereinafter, the embossments 60 cooperate not only to keep the pleated sets 23 in spaced relation, but also stiffen the pleats and distribute air over the pleats in an even fashion so as to increase the capacity of the filter media 12 while reducing restriction.

Figure 5:
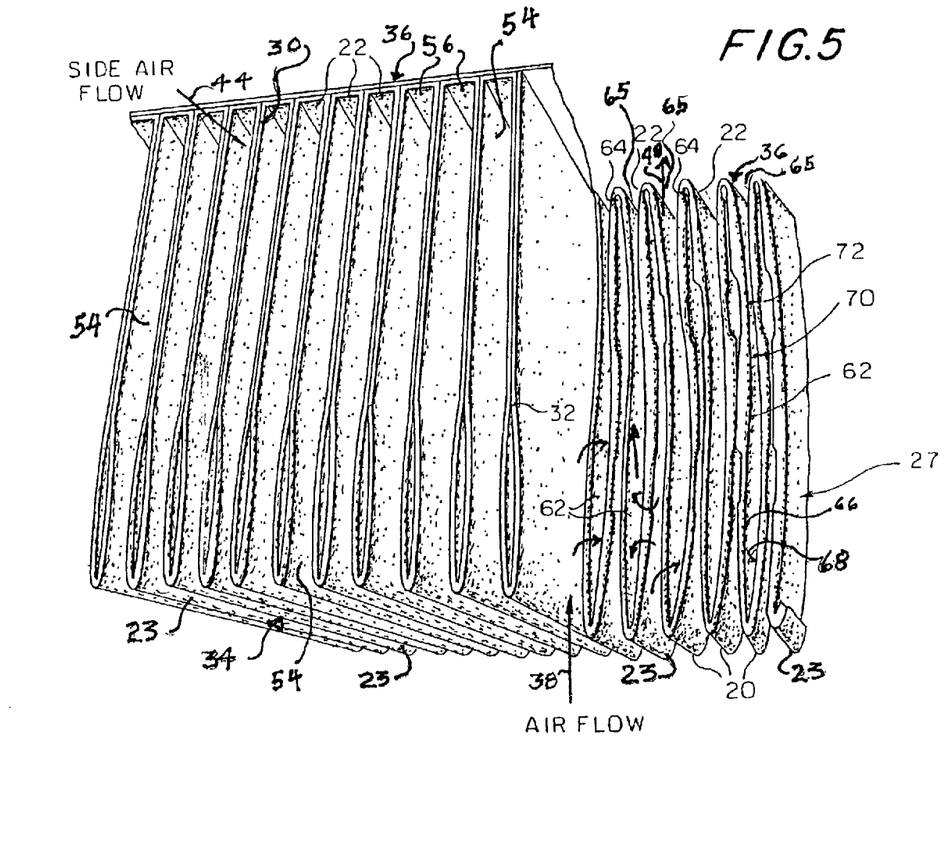
FIG. 5 is a bottom perspective view of the filter of FIGS. 1–4 showing a portion of the filter media cut away.

Referring now mainly to FIG. 5, where the filter media 12 has been severed through the pleated sets 23 to reveal pockets 62, which open upwardly through openings 65 which coincide with the clean side face 36 of the filter element 10. As with the dirty sides 40 and 42 of the panels 24 and 26, clean sides 66 and 68 of the panels are kept separated by arrays of spaced embossments 70 projecting from the first and second panels 24 and 26 into the pockets 62. As with the dirty sides of the panels the embossments 70 abut but have gaps 72 therebetween so that clean air in a direction 48 flows from the peaks 20 toward the openings 65, and is channeled by the embossments 70. If necessary the clean air can pass laterally through the gaps 72 between embossments 70 so as to even out clean air flow and make it more laminar, which is desirable if the clean air is combustion air for an internal combustion engine.

Figure 6:
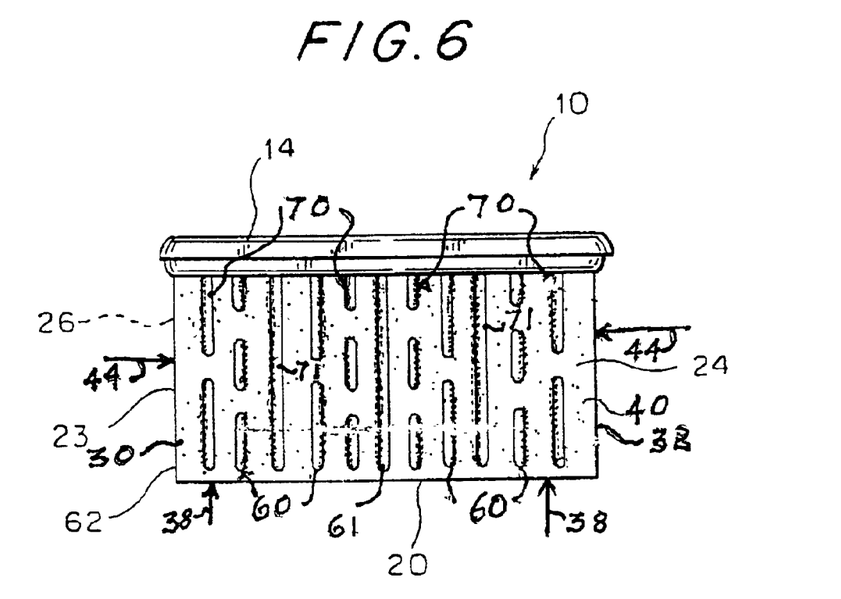
FIG. 6 is a first end view of the filter element showing a first panel.
Figure 7:
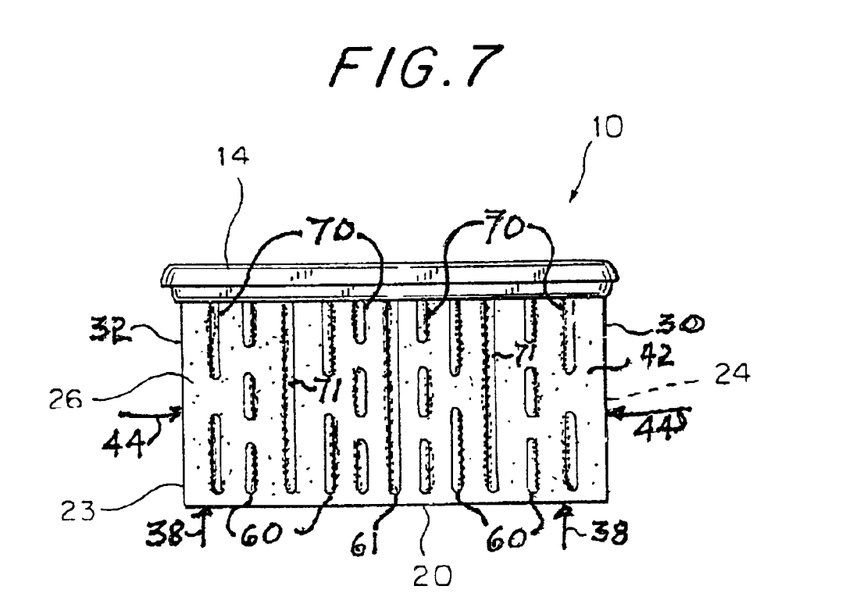
FIG. 7 is a second end view of the filter element showing a second panel.

Referring now mainly to FIGS. 6 and 7 as well as FIG. 5 wherein end views of the filter element 10 reveal embossment structure, it is seen that the first and second panels 24 and 26 have the arrays of spaced embossments 60 and 70 that respectively keep the pleat sets 23 spaced from one another and keep the pleat sets 23 open to define the interior pockets 62 (FIG. 5). The first panel 24 and the second panel 26 are substantially identical so that when the first and second panels are folded at the peaks 20, the arrays of spaced embossments 70 abut within the pocket 62 (see FIG. 5) with gaps 72 therebetween, while the elongated continuous embossments 71 abut, and with the closed edges 30 and 32, form three substantially closed first channels within the pockets 62.

Figure 8:
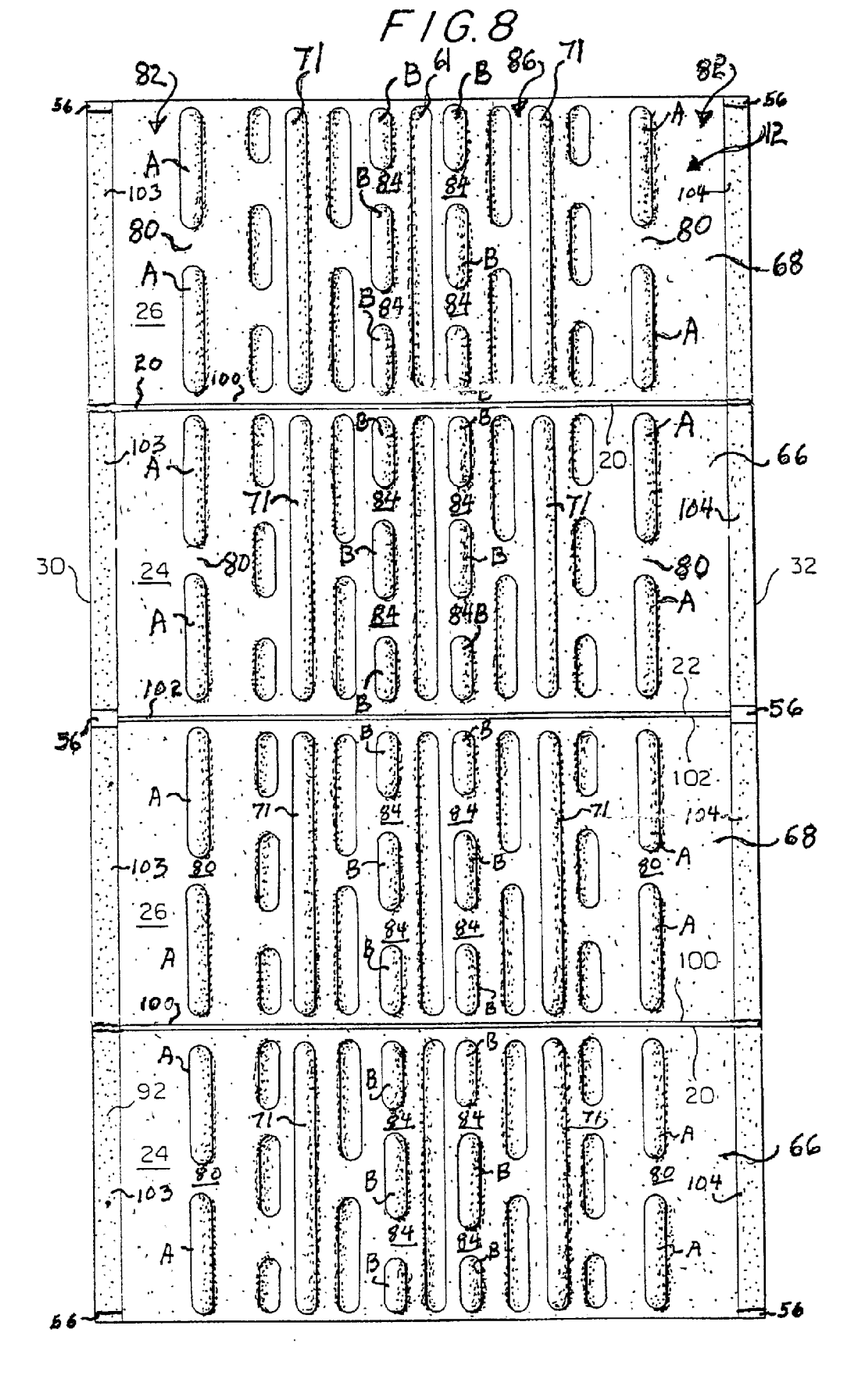
FIG. 8 is a planar view of the dirty side of the filter media before being pleated.

Referring now to FIG. 8 where the clean sides 66 and 68 of the filter media 12 are shown prior to folding the media web 12 at peaks 20 and valleys 22, it is seen that upon folding the media web, pairs of spaced embossments A abut within the pockets 62 of FIG. 5. Gaps 80 occur between the spaced embossments A. The two elongated continuous embossments 71 with the opposite edges 30 and 32 of the filter media 12 form a pair of closed channels 82 adjacent opposite edges. The spaced columns of three embossments B, with spaces 84 therebetween are in a central channel 86 in pockets 62 (FIG. 5) between a pair of the elongated continuous embossments 71. Upon folding the filter media 12 so that the panels 24 and 26 have clean-side surfaces 66 and 68 in abutment and then adhering the edges 30 and 32 to one another with beads of adhesive, the interior pockets 62 of FIG. 5 are created.

Figure 9:
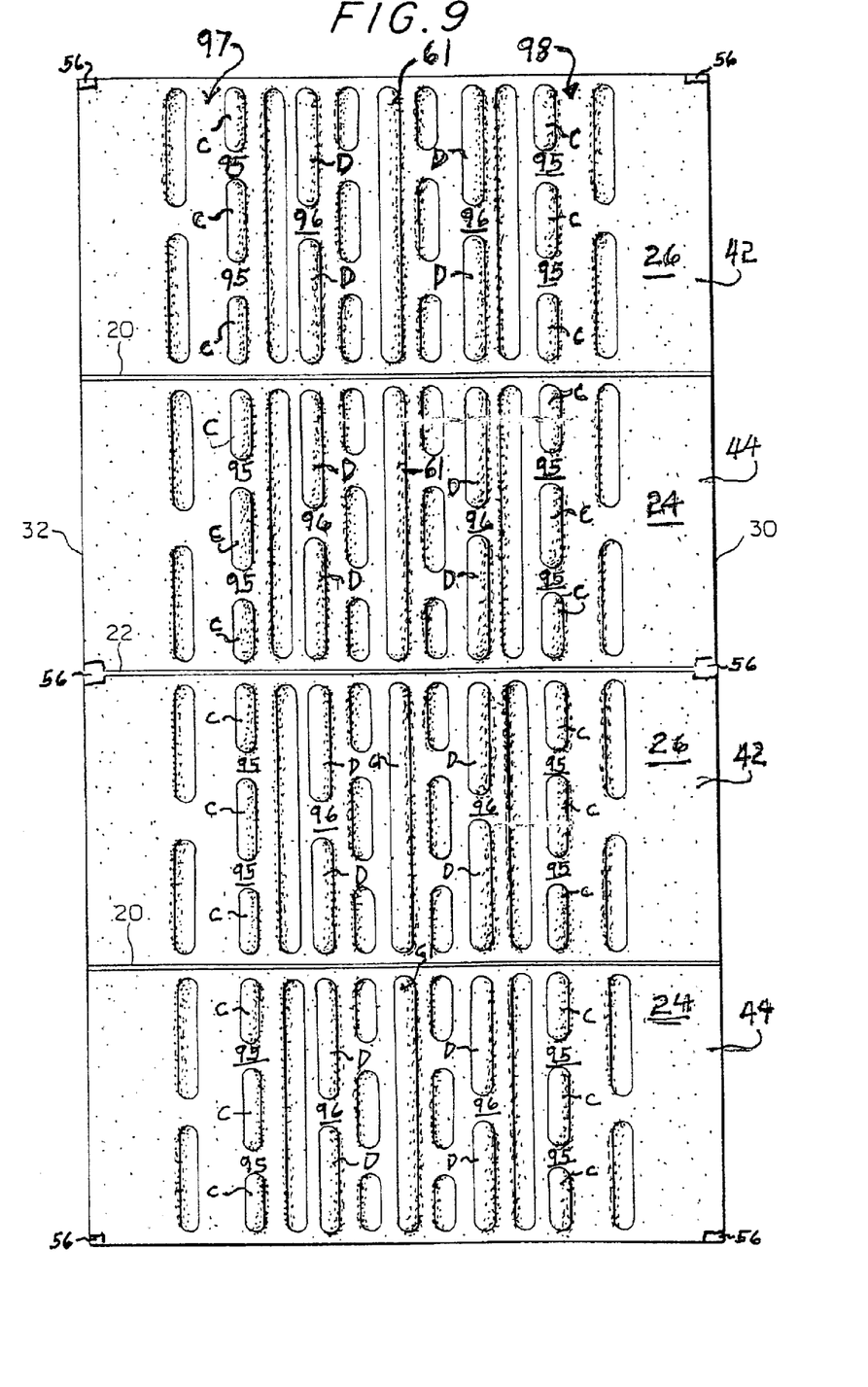
FIG. 9 is a planar view of the clean side of the filter media before being pleated.

Referring now to FIG. 9, a second array of embossments 61, including three spaced embossments C separated by spaces 95; pairs of embossments D separated by spaces 96, and the continuous central embossment 61, project from the dirty sides 40 and 42 of the first and second panels 24 and 26. These embossments abut one another to help keep the pleated sets 23 separated to provide the gaps 54 therebetween (see FIGS. 4 and 5). When folded, the continuous center embossment 61 channels air through the dirty-side face 34 and between the sides edges 30 and 32 in two separate channels 97 and 98 on the dirty side of the filter media 12.

As is seen in FIGS. 8 and 9 where the filter media 12 is shown flat prior to folding at creases 100 and 102 to form the peaks 20 and valleys 22, it is seen that first and second panels 24 and 26 are identically embossed so that upon folding, the appropriate embossments face one another to provide interior and exterior spacing. As is seen in FIG. 8, at least the first panels 24 have beads of adhesive 103 and 104 proximate edges 30 and 32, respectively. The panels 24 and 26 are folded along the creases 100 and 102 to form the peaks 20 and valleys 22 of the pleated filter media with the adhesive beads 103 and 104 adhering the edges 30 and 32 of the panels 24 and 26 together so as to form the pockets 62 shown in FIG. 5. Each valley 22 has the flattened area 56 at each end in order to help keep the edge portions 30 and 32 of adjacent panels 24 and 26 separate. In that the seal 14 is molded around the filter media 10, the material of the seal engages and wedges adjacent the flattened panel portion 56 to help stiffen the base portion of the filter media formed by the valleys 22.

The aforedescribed filter element has use as an air filter for internal combustion engines. Since the height of the pleats is approximately 3 inches, the various embossments described provide stiffness as well as spacing.

Figure 10:
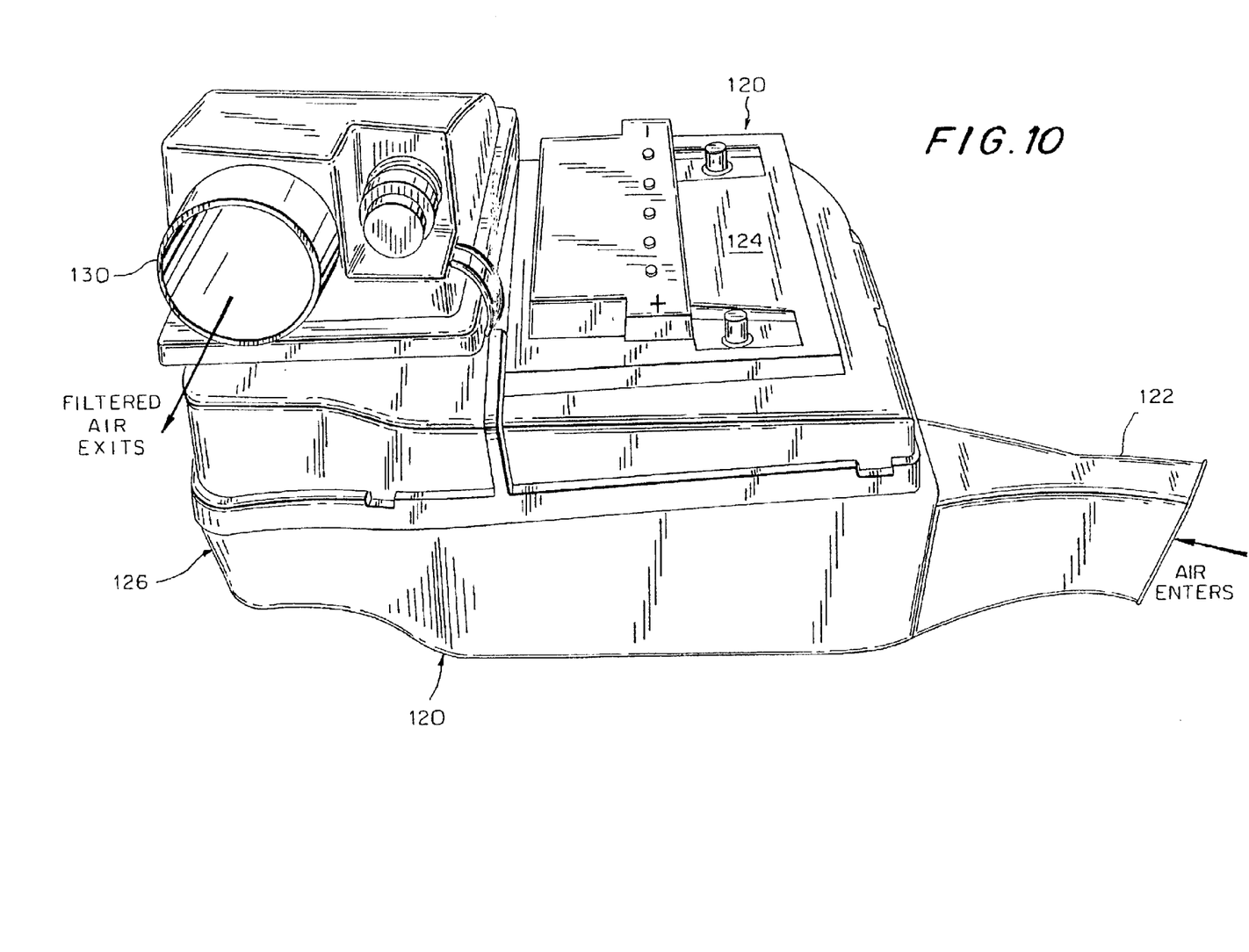
FIG. 10 is a perspective view of an air cleaner for engine combustion air which utilizes the filter element of FIGS. 1–9.

FIG. 10 illustrates an air cleaner 120 for an internal combustion engine (not shown) in which a filter element 10 embodying the principles of the present invention is used. Dirty air enters the air cleaner 120 through an inlet 122, passes adjacent to and around a storage battery 124 and into a filter housing 126. The dirty air then rises through the dirty-side face 34 of the filter media 12 (FIG. 1) within the filter housing as well as passing laterally through the sides of the filter media. Clean air passes through the clean-side face 34 (FIG. 1) of the filter media 12 and out of the outlet 130 for combustion by the associated engine.

While the filter element 10 is shown being used to filter air, the structure of the filter media 12 and filter element is usable to filter other gases as well as fluids in general including liquids.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A panel filter element, comprising:
   a pleated filter media having peaks and valleys and having a clean and a dirty side, the pleated filter media having arrays of embossments projecting from one of the sides, and being arranged with sets of pleats having edges which are closed to form the clean side of the pleated filter media into pockets with openings adjacent to the valleys, and
   a peripheral seal around the filter media forming a barrier between the clean and dirty sides wherein dirty fluid passes through the filter media and emerges as clean fluid; the arrays of embossments being arranged in columns extending between the peaks and valleys in a direction transverse to the peaks and valleys with some of the embossments being elongated and spaced to form gaps that allow fluid to flow between the embossments and wherein some embossments extend continuously from the peaks to the valleys to form channels directing fluid flow in a direction transverse to the peaks and valleys.

2. A filter element comprising:
   a continuous pleated filter media having a series of first and second panels having clean sides and dirty sides separated by folds, the clean sides being adhered adjacent the edges thereof to form pleated filter media sets with the folds forming the peaks that define one face of the pleated filter media with one of the sides of the panels forming closed filter media sets facing one another, the sets being joined by valleys of the pleated filter media, the valleys defining the other side face of the pleated filter media;
   embossments projecting from both the clean and dirty sides of the filter media and extending in directions transverse to the peaks and valleys to keep the first and second panels separate from one another so that fluid may pass therebetween for flow through the filter media from the dirty sides of the first and second panels to the clean sides of the panels, the embossments including arrays of spaced embossments which let fluid pass laterally past the arrays, at least one continuous embossment in each first and second panel projecting from at least one of the sides of the first and second panels to separate the sides of the panels into portions, whereby fluid flowing laterally between the closed filter media sets and flowing transverse to one of the side faces is divided into separate fluid streams.

3. The filter element of claim 2 wherein the filter media has a seal around the clean side face of the filter media, the valleys being embedded in the seal adjacent the sides of the filter media.

4. The filter element of claim 3 further including a screen over one of the side faces of the pleated filter media.

5. The filter element of claim 3 further including continuous embossments projecting from the other sides of the first and second panels and spaced laterally from the central continuous embossment to subdivide the other sides of the first and second panels into separate chambers which open through the other side face of the filter element.

6. The filter element of claim 5 wherein the filter media is cellulous material and the seal is polyurethane.

7. A filter media for inclusion with a filter element comprising:
a web of filter media material having clean and dirty sides and first and second longitudinally extending edges, the web being divided by transverse fold lines into a plurality of first and second panels, wherein the first and second panels face one another on both the clean and dirty sides when the web is folded in opposite directions to form a pleated filter media having peaks and valleys extending transversely with respect to the edges providing a dirty side and clean side faces;
lines of adhesive extending on one of the sides of the web at the first and second edges of the web for adhering the first and second panels to one another at the first surface when the web is folded to form the pleated filter media, one of the side faces of the pleated filter media being free of adhesive so that fluid enters the filter media as the fluid flows between the peaks and the valleys and also as the fluid flows laterally from the first and second edges over one of the sides of filter media material laterally into the pleated filter media, and
arrays of spaced embossments elongated in a direction normal to the peaks and valleys, the arrays of spaced embossments including a first array of spaced embossments in the web of media material projecting from the other side and engaging the other side of the filter media to maintain space between first and second panels on the other side so that filtered fluid emerges from the other side between the first and second panels as dirty fluid impinges on the dirty side of the filter media.

8. The filter media of claim 7 further including a second array of spaced embossments projecting from one of the sides of the filter media and abutting that side of the filter media when the filter media is folded into a pleated filter media to hold the first and second panels on that side in spaced relation as dirty fluid impinges on that side.

9. The filter media of claim 8 wherein the first array of spaced embossments is on the clean side of the filter media and the embossments are located in positions on the first and second panels which are aligned when the filter media is pleated and abut to keep the first and second panels separated.

10. The filter media of claim 8 wherein both the clean and dirty sides of the filter media both have arrays of spaced embossments projecting therefrom which are arranged to align when the filter media is folded so that the spaced embossments on the first panel are aligned with corresponding spaced embossments on the second panel to engage one another on both the clean and dirty sides of the filter media to keep the sides spaced from one another.

11. The filter media of claim 7 wherein the first array of spaced embossments is on the clean side of the filter media and the embossments are located in positions on the first and second panels which are aligned when the filter media is pleated and abut to keep the first and second panels separated.

12. The filter media of claim 7 wherein the arrays of embossments include elongated embossments projecting from the clean sides of the first and second panels for engaging one another and channeling clean side fluid out of the filter media in a direction parallel with adhered edges of the filter media.

13. The filter media of claim 12 wherein the arrays of embossments include elongated embossments projecting from the dirty sides of the first and second panels engaging one another to keep the first and second panels in spaced relation and to channel dirty fluid from the peaks to the valleys of the pleated filter media.

14. The filter media of claim 13 wherein the spaced embossments are of different lengths and are arranged in columns with spaces therebetween, the spaces in one column being out of alignment with the spaces of adjacent columns.

15. The filter media of claim 14 wherein the valleys of the pleated filter media adjacent the edges are obtuse, thereby separating adjacent sets of adhered first and second panels adjacent the edges of the filter media.

* * * * *

UNITED STATES PATENT AND TRADEMARK OFFICE
CERTIFICATE OF CORRECTION

PATENT NO. : 6,824,581 B1
DATED : November 30, 2004
INVENTOR(S) : Tate et al.

It is certified that error appears in the above-identified patent and that said Letters Patent is hereby corrected as shown below:

Column 5,
Line 38, after "providing", delete "a".

Signed and Sealed this

Tenth Day of May, 2005

JON W. DUDAS
*Director of the United States Patent and Trademark Office*